UNITED STATES PATENT OFFICE.

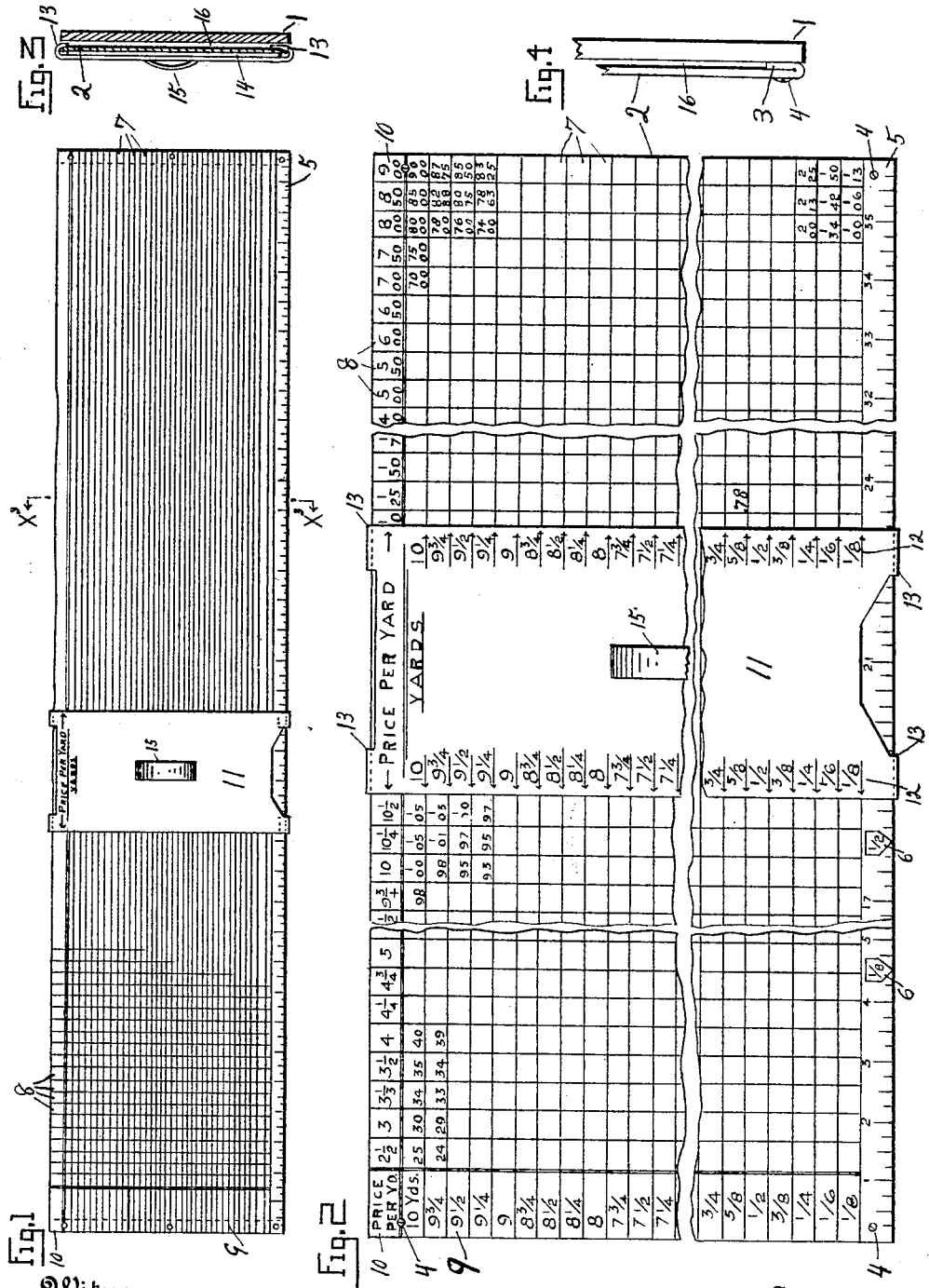

JAMES HENRY BRADY, OF LOUISVILLE, KENTUCKY.

COMPUTING-MEASURE.

1,119,395. Specification of Letters Patent. Patented Dec. 1, 1914.

Application filed February 24, 1914. Serial No. 820,447.

*To all whom it may concern:*

Be it known that I, JAMES HENRY BRADY, a citizen of the United States, residing at the city of Louisville, in the county of Jefferson and State of Kentucky, have invented certain new and useful Improvements in Computing Measures, of which the following is a specification.

This invention relates to computing measures, and an object is to provide a computing measure which is simple in construction and operation, and that may be readily understood by the average clerk.

A further object is the provision of means for indicating the exact price of any given quantity of material at different prices per unit of measure, the calculation being made without mental effort on the part of the seller.

As shown in the drawing and hereafter described, it is the intention to have the measure one yard in length, since it is especially adapted for use in dry-goods stores, or other places where the yard is the unit of measure, although it is evident that it may be used with other units of measurement. The measure is preferably graduated to indicate inches from one to thirty-six, where the unit used is the yard, indices being provided along the scale to indicate the fractional parts of the yard.

A novel feature of the invention is the provision of a bridge, or finder, adapted to be freely adjusted along the device and having columns of factors indicative of quantity arranged along the edges thereof.

A practical embodiment of the invention is represented in the accompanying drawing, forming a part of this specification, in which like reference characters indicate corresponding parts in the several views.

Referring to the drawing, Figure 1, is a top plan view, on a reduced scale; Fig. 2, a plan view on a larger scale, parts being broken away; Fig. 3, a section on line $x^3$—$x^3$ of Fig. 1; Fig. 4, a partial elevation.

In the drawing the reference numeral —1— indicates a base, of laminated wood, aluminum or other suitable material; —2— indicates a plane sheet of suitable material, the ends —3— of which are folded under, forming a two-fold thickness through which suitable securing means, such as screws —4— are passed for the purpose of securing the sheet, or chart, to the base (see Fig. 4). This construction raises the body of the sheet from the base a distance equal to the thickness of the material of which it is formed, leaving a space —16—. On the lower edge of the chart is imprinted a measure —5—, in the present embodiment a yard measure, graduated to indicate inches, and having escutcheons —6— suitably positioned, on which appear the fractional indications 1/8, 1/2, etc. The remainder of the chart is arranged in horizontal rows —7—, and vertical columns —8—. A column on either, or each, end contains factors —9— indicative of quantity, in the present instance said factors range from 1/8 to 10 yards. In the top row are arranged a series of numerals —10— denoting the price per unit of measurement, ranging in this embodiment from 2 1/2 cents to $9.00 per yard. Figures designating the selling price of a stated quantity at a given price are positioned in squares at the intersections of the rows with the columns; as per example the selling price, $1.13, of 1/8 yard at $9.00 per yard will be found by following the row, at the beginning of which stands the factor 1/8, to its intersection with the column at the head of which stands the numeral 9.00; similarly the price of 9 1/2 yards at 10 cents per yard will be found to be .95.

It is obvious that it will be troublesome to follow the rows across a chart crowded with figures. To overcome this difficulty I provide a bridge —11— on which, in proximity to the front and rear edges of which, I arrange columns of factors —12—, indicative of quantity, similar to those in the columns 9. The bridge may be shifted back and forth to bring either edge parallel with a desired column of selling prices, under a given price per unit, when the selling price of the quantity in question will be found opposite the factor, on the bridge, denoting the same. As per example the selling price of 9 1/4 yards at .10 1/2 cents will be found to be 97 cents. Similarly the selling price of 5/8 of a yard at 1.25 will be found to be .78. The bridge 11 is formed, preferably, of sheet metal of a relatively lighter gage than the sheet 2 in order that projections —13— which extend from the corners of the bridge may be folded over the edge of the sheet and be free to move in the space 16 between the sheet and the base (as shown in Fig. 3). The width of the bridge is such that the projections give a firm bearing on the edges of the sheet, yet the bridge may be moved freely and without binding. A layer of soft material —14—, such as felt, is placed between the bridge and the sheet to prevent scratching, or marring, of the sheet by the shifting of the bridge. A handle —15—, centrally positioned on the bridge is drawn up integrally from the body thereof.

It is thought that the foregoing will allow the manifold advantages of my invention to be fully appreciated without more extended description. It being understood that changes and modifications may be resorted to that come within the scope of the appended claims.

Having thus described my invention I claim;—

1. In a computing measure, a base, a chart secured thereon, the end of said chart being doubled under, securing means passing through said two-fold thickness, a scale of measurement imprinted on said chart likewise a column of factors indicative of quantity, a row of numerals denoting prices per unit and figures designating prices per quantity, a bridge, factors on said bridge corresponding to the factors on said chart, projections on each corner of said bridge, said projections folded over the edge of the chart and adapted to retain the bridge in position, a handle formed up integral with said bridge, and a cushion interposed between the bridge and chart.

2. In a computing measure, a base, a chart secured thereon, the ends of said chart being doubled under and serving to space the body of the chart from the base, securing means passing through said two fold thickness and engaged in the base, a bridge positioned on said chart and adapted to be shifted lengthwise thereon, projections on each corner of the bridge, said projections folded over and under the edge of the chart and serving to retain the bridge thereon, and a cushion interposed between the bridge and the chart to prevent abrasion of the latter.

J. HENRY BRADY.

Witnesses:
W. B. MUNNELL,
ELIZABETH K. BIRD.

Copies of this patent may be obtained for five cents each, by addressing the "Commissioner of Patents, Washington, D. C."